United States Patent
Yamaji

(10) Patent No.: US 8,509,564 B2
(45) Date of Patent: Aug. 13, 2013

(54) GRAPHIC ARRANGEMENT DECIDING METHOD, RECORDING MEDIUM AND INFORMATION PROCESSING APPARATUS

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 201 days.

(21) Appl. No.: 12/891,104

(22) Filed: Sep. 27, 2010

(65) Prior Publication Data

US 2011/0075945 A1  Mar. 31, 2011

(30) Foreign Application Priority Data

Sep. 29, 2009 (JP) ................................. 2009-225043
Aug. 11, 2010 (JP) ................................. 2010-180447

(51) Int. Cl.
*G06K 9/36* (2006.01)
*G06K 9/20* (2006.01)
*G06K 9/34* (2006.01)

(52) U.S. Cl.
USPC ............................ 382/284; 382/173; 382/283

(58) Field of Classification Search
None
See application file for complete search history.

(56) References Cited

U.S. PATENT DOCUMENTS

| | | | | |
|---|---|---|---|---|
| 6,771,278 B2 * | 8/2004 | Shigeta | ........................ | 345/634 |
| 6,993,184 B2 * | 1/2006 | Matsugu | ...................... | 382/173 |
| 7,206,017 B1 * | 4/2007 | Suzuki | ............................ | 348/36 |
| 7,340,092 B2 * | 3/2008 | Tanaka et al. | ................. | 382/170 |
| 7,382,378 B2 * | 6/2008 | Levene et al. | ................ | 345/592 |
| 7,403,641 B2 * | 7/2008 | Nakamoto et al. | ............ | 382/118 |
| 7,623,733 B2 * | 11/2009 | Hirosawa | ..................... | 382/284 |
| 7,929,016 B2 * | 4/2011 | Yoshida et al. | .............. | 348/159 |
| 7,990,564 B2 * | 8/2011 | Hanechak | ..................... | 358/1.18 |
| 8,121,407 B1 * | 2/2012 | K et al. | ......................... | 382/173 |
| 8,135,182 B2 * | 3/2012 | Luo et al. | ...................... | 382/118 |
| 2001/0014182 A1 * | 8/2001 | Funayama et al. | ............ | 382/282 |
| 2002/0140829 A1 * | 10/2002 | Colavin et al. | ........... | 348/231.99 |
| 2003/0067158 A1 * | 4/2003 | McIntyre et al. | .............. | 283/67 |
| 2003/0072486 A1 * | 4/2003 | Loui et al. | ..................... | 382/175 |
| 2004/0130626 A1 * | 7/2004 | Ouchi et al. | ............... | 348/207.1 |
| 2004/0165000 A1 | 8/2004 | Nagahashi et al. | | |
| 2005/0093886 A1 * | 5/2005 | Kubota | ........................ | 345/619 |
| 2006/0061787 A1 * | 3/2006 | Kinjo | ............................ | 358/1.9 |
| 2006/0078224 A1 * | 4/2006 | Hirosawa | ..................... | 382/284 |
| 2007/0046669 A1 * | 3/2007 | Choi et al. | .................... | 345/440 |

(Continued)

FOREIGN PATENT DOCUMENTS

| | | |
|---|---|---|
| JP | 2004-128683 | 4/2004 |
| JP | 2004-199248 | 7/2004 |
| JP | 2005-252739 | 9/2005 |
| JP | 2007-267008 | 10/2007 |

*Primary Examiner* — Stephen R Koziol
*Assistant Examiner* — Sean Conner
(74) *Attorney, Agent, or Firm* — Young & Thompson

(57) ABSTRACT

A graphic arrangement deciding method includes the steps of: acquiring, by an information processing apparatus, photographed region information corresponding to information which identifies a photographed region and unphotographed region information corresponding to information which identifies an unphotographed region, from a wide-angle image; setting, by the information processing apparatus, order of priority of a partial region which is located at a desired position and has a desired size within the photographed region identified by the photographed region information, on the basis of an attribute of the partial region; and deciding, by the information processing apparatus, arrangement of one or a plurality of graphics associated with the wide-angle image, on the basis of the unphotographed region information and the order of priority of the partial region. Thus, a more attractive photo book is created with the use of an unphotographed part of an image having an uneven boundary region.

15 Claims, 13 Drawing Sheets

(56) References Cited

U.S. PATENT DOCUMENTS

| | | | |
|---|---|---|---|
| 2007/0110422 A1* | 5/2007 | Minato et al. | 396/89 |
| 2007/0146833 A1* | 6/2007 | Satomi et al. | 358/537 |
| 2008/0063273 A1* | 3/2008 | Shimodaira | 382/171 |
| 2009/0022422 A1* | 1/2009 | Sorek et al. | 382/284 |
| 2010/0053364 A1* | 3/2010 | Mino et al. | 348/222.1 |
| 2010/0073372 A1* | 3/2010 | Ma et al. | 345/428 |
| 2010/0214442 A1* | 8/2010 | Uemura et al. | 348/231.2 |
| 2011/0038540 A1* | 2/2011 | Ahn et al. | 382/173 |
| 2011/0123124 A1* | 5/2011 | Peters | 382/225 |
| 2011/0242274 A1* | 10/2011 | Yamaji | 348/36 |
| 2011/0242336 A1* | 10/2011 | Yamaji | 348/207.2 |
| 2011/0310119 A1* | 12/2011 | Takagi | 345/620 |
| 2012/0002899 A1* | 1/2012 | Orr et al. | 382/282 |

* cited by examiner

FIG.4
PORTION 1      PORTION 2
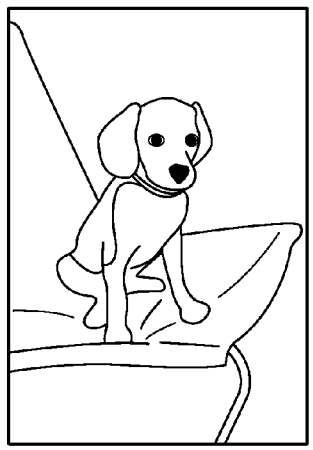 
FIG.5
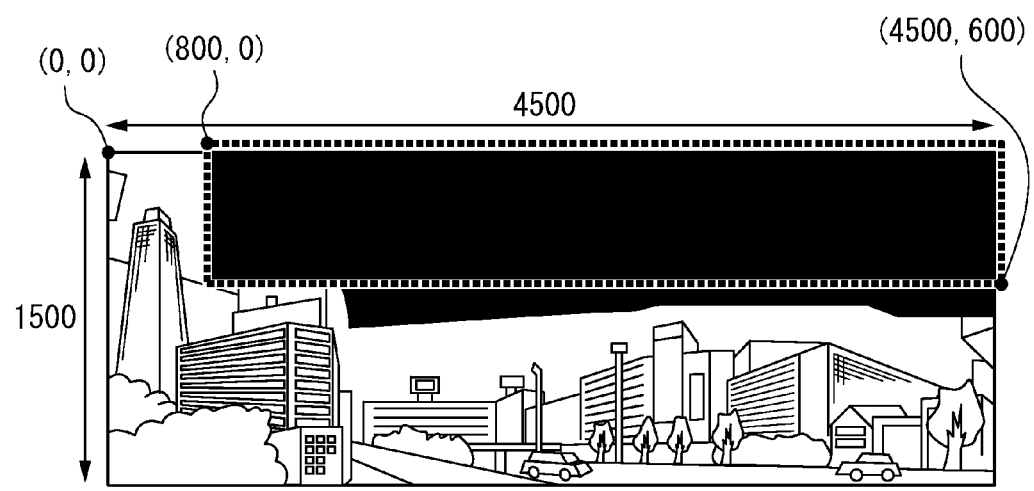

FIG.12
|  | PHOTOGRAPHING TIME PERIOD | AREA | AREA/TIME PERIOD | ORDER OF PRIORITY |
|---|---|---|---|---|
| RED FRAME (T1) | 10 SECONDS | 1200 pixel | 120 PIXELS/SECOND | 3 |
| YELLOW FRAME (T2) | 15 SECONDS | 1400 pixel | 93 PIXELS/SECOND | 1 |
| BLUE FRAME (T3) | 20 SECONDS | 2000 pixel | 100 PIXELS/SECOND | 2 |
FIG.13
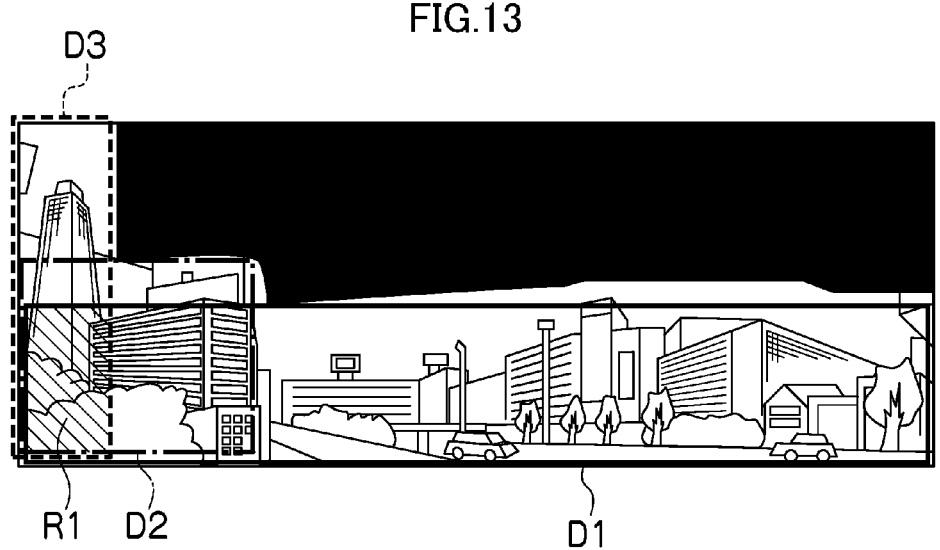
FIG.14
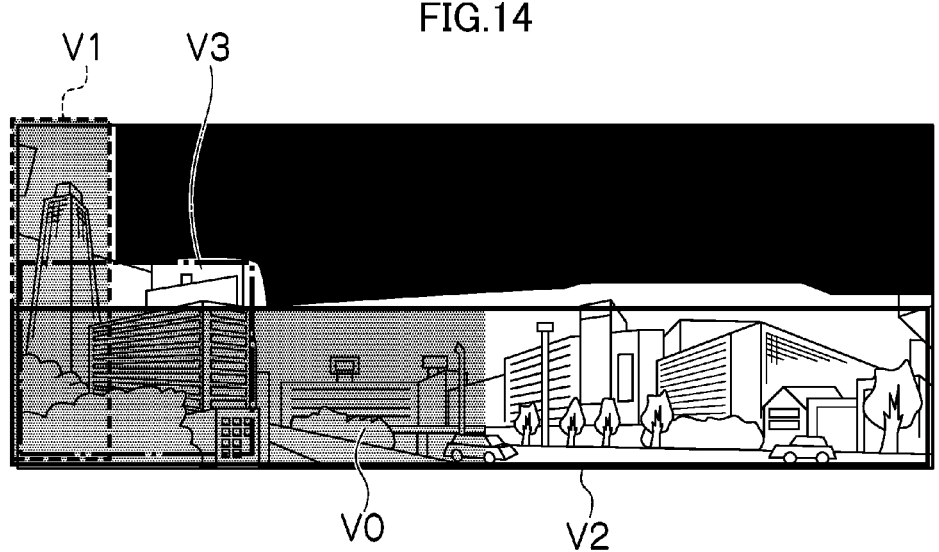

FIG.17
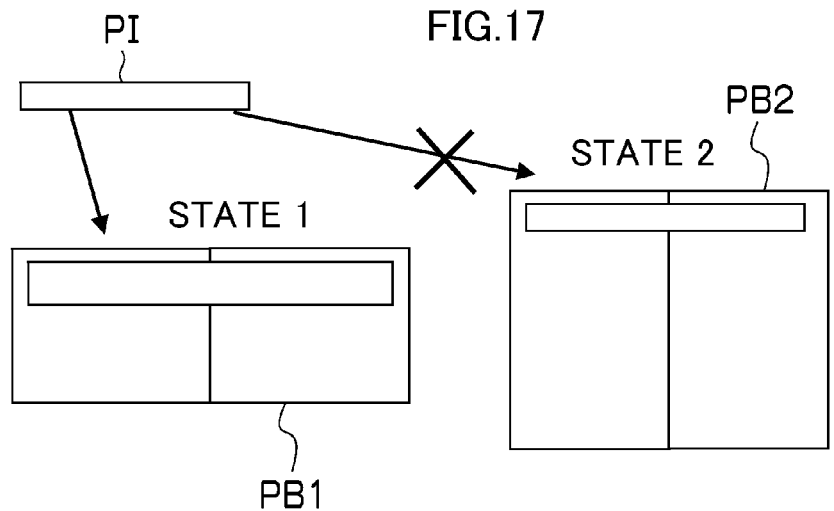
FIG.18A
| PRINT SIZE OF PHOTO BOOK [pixel] | | | UPPER LIMIT OF ASPECT RATIO OF PANORAMIC IMAGE |
|---|---|---|---|
| HEIGHT | WIDTH | ASPECT RATIO | |
| 3000 | 3000 | 1:1 | 1:8 |
| 3000 | 2000 | 3:2 (1:0.66) | 1:6 |
| 1500 | 3000 | 1:2 | 1:10 |
| | | | |
| | | | |
FIG.18B
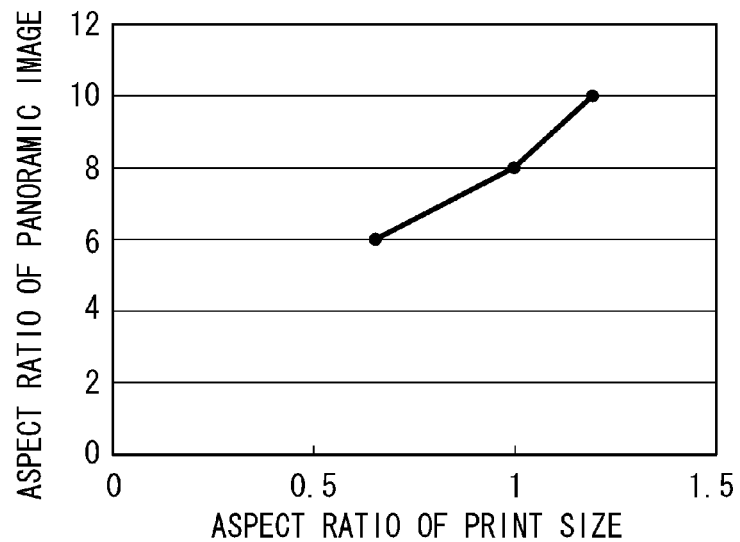

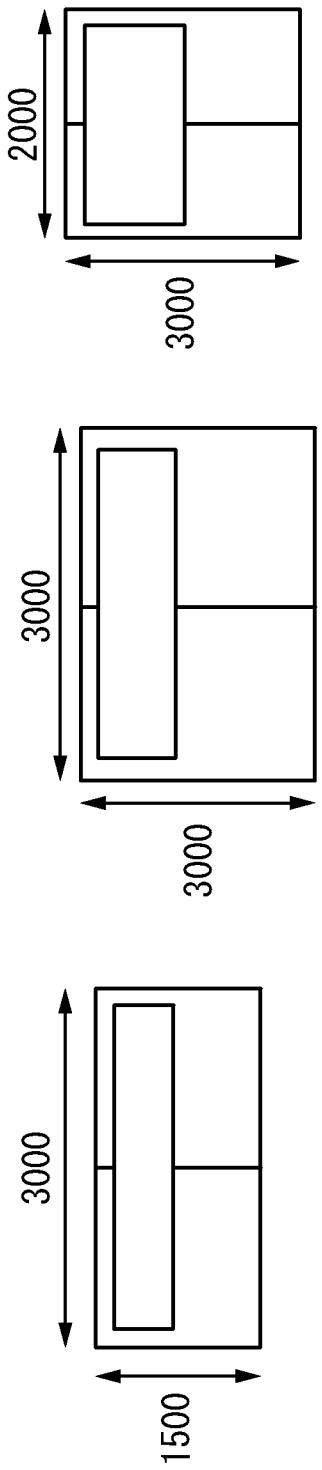

RL  RT

RELATED ART

RELATED ART

GRAPHIC ARRANGEMENT DECIDING METHOD, RECORDING MEDIUM AND INFORMATION PROCESSING APPARATUS

BACKGROUND OF THE INVENTION

1. Field of the Invention

The presently disclosed subject matter relates to the layout creation of a photo book using a wide-angle image.

2. Description of the Related Art

According to the invention disclosed in Japanese Patent Application Laid-Open No. 2004-128683, movement information at the time of photographing with a digital camera measured by various sensors such as a three-dimensional gyroscope, zooming movable device operation information on zoom driving mechanism, and a three-dimensional acceleration measurement unit, and the measured information is attached to image data correspondingly to each frame to be recorded in a memory card or a built-in memory. Then, the movement information is extracted by a splitting device from the image data to which the recorded movement information is given, a movement direction and a movement distance of the digital camera at the time of photographing are computed by a computation device on the basis of the extracted movement information, and adjacent subject frames are extracted by an image processing device to create a panoramic image.

An image layout apparatus according to the invention disclosed in Japanese Patent Application Laid-Open No. 2004-199248 includes: a target region calculation device which calculates a target region of an image A which is superimposed on a rear side of another image B; and a layout device which lays out the target region of the image A so as not to overlap with the image B.

Japanese Patent Application Laid-Open Nos. 2005-252739 and 2007-267008 each disclose an example of a conventional technology for creating a panoramic image from a still image and a moving image. When a wide-angle panoramic image is placed on a photo book as illustrated in FIG. 22, the photo book becomes much more attractive compared with a conventional case where normal still images are simply placed on a page. The panoramic image can be created by joining or superimposing a plurality of images (still images or moving image frames) including subjects which at least partially overlap with each other so that the overlapping parts of the subjects are superimposed with each other.

SUMMARY OF THE INVENTION

A method of combining a plurality of still images or combining a plurality of moving image frames is generally known as the method of creating a panoramic image. However, in any of these cases, photographing is performed while a user is moving a camera, and hence a panoramic image having an uneven boundary region as illustrated in FIG. 23 may be created in some cases. In this case, the photographed part is meaningful, whereas the unphotographed part painted in black in FIG. 23 is meaningless.

The presently disclosed subject matter has an object to create a more attractive photo book with the use of an unphotographed part of a wide-angle image having an uneven boundary region.

The presently disclosed subject matter provides a graphic arrangement deciding method to be performed by an information processing apparatus, including: acquiring photographed region information corresponding to information which identifies a photographed region and unphotographed region information corresponding to information which identifies an unphotographed region, from a wide-angle image; setting order of priority of a partial region which is located at a desired position and has a desired size within the photographed region identified by the photographed region information, on the basis of an attribute of the partial region; and deciding arrangement of one or a plurality of graphics associated with the wide-angle image, on the basis of the unphotographed region information and the order of priority of the partial region.

The graphic arrangement deciding method may further include extracting one or a plurality of partial regions from the wide-angle image on the basis of the order of priority.

The graphic arrangement deciding method may further include deciding arrangement of the one or the plurality of extracted partial regions as the one or the plurality of graphics associated with the wide-angle image.

The graphic arrangement deciding method may further include deciding the arrangement of the graphics associated with the wide-angle image so that the extracted partial regions avoid overlapping with the graphics.

The order of priority of the partial region may be set on the basis of any one of the number of a particular type of subjects within the partial region, a photographed area of the partial region per unit photographing time, and the number of overlaps with different partial regions.

The graphic arrangement deciding method may further include deciding the arrangement of the graphics associated with the wide-angle image so that the photographed region avoids overlapping with the graphics.

The graphic arrangement deciding method may further include deciding the arrangement of the graphics associated with the wide-angle image so that blank space on an arrangement page of the unphotographed region and the wide-angle image overlaps with the graphics.

The graphic arrangement deciding method may further include deciding an upper limit of an aspect ratio of the wide-angle image on the basis of a size of an arrangement page of the wide-angle image.

The graphic arrangement deciding method may further include creating the wide-angle image on the basis of the decided upper limit of the aspect ratio.

The graphic arrangement deciding method may further include extracting the partial region from the wide-angle image on the basis of the decided upper limit of the aspect ratio.

The unphotographed region information may include one of positional coordinates of the unphotographed region on the wide-angle image and a predetermined color on the wide-angle image.

The presently disclosed subject matter further includes: a non-transitory recording medium on which a program is recorded, the program comprising computer-executable instructions to make a computer to execute the graphic arrangement deciding method; and an information processing apparatus which executes the graphic arrangement deciding method.

According to the presently disclosed subject matter, unlike the case where an arbitrary image is simply placed in a blank region in which a subject does not exist, it is possible to effectively utilize the unphotographed region of the wide-angle image as an arrangement region of the graphics, to thereby provide a high-value photo book.

BRIEF DESCRIPTION OF THE DRAWINGS

FIG. 4 is a view illustrating an example of a mask image corresponding to the unphotographed region;

FIG. 5 is a view illustrating an example of text information indicating coordinates of the unphotographed region;

FIG. 12 is a table showing an example of order of priority of rectangular regions which is set on the basis of sizes of photographed areas per unit time;

FIG. 13 is a view illustrating an example of a common region of rectangular region patterns;

FIG. 14 is a view illustrating an example of extraction of the common region;

FIG. 17 is a view illustrating an example of positional deviation of a panoramic image which is placed on a page of a photo book;

FIGS. 18A and 18B are a table and a graph showing an example of upper limits of image aspect ratios, respectively;

FIGS. 19A to 19C are views illustrating cases where panoramic images according to the upper limit of the image aspect ratio are placed on the photo book having a corresponding size;

DETAILED DESCRIPTION OF THE PREFERRED EMBODIMENTS

Figure 1:
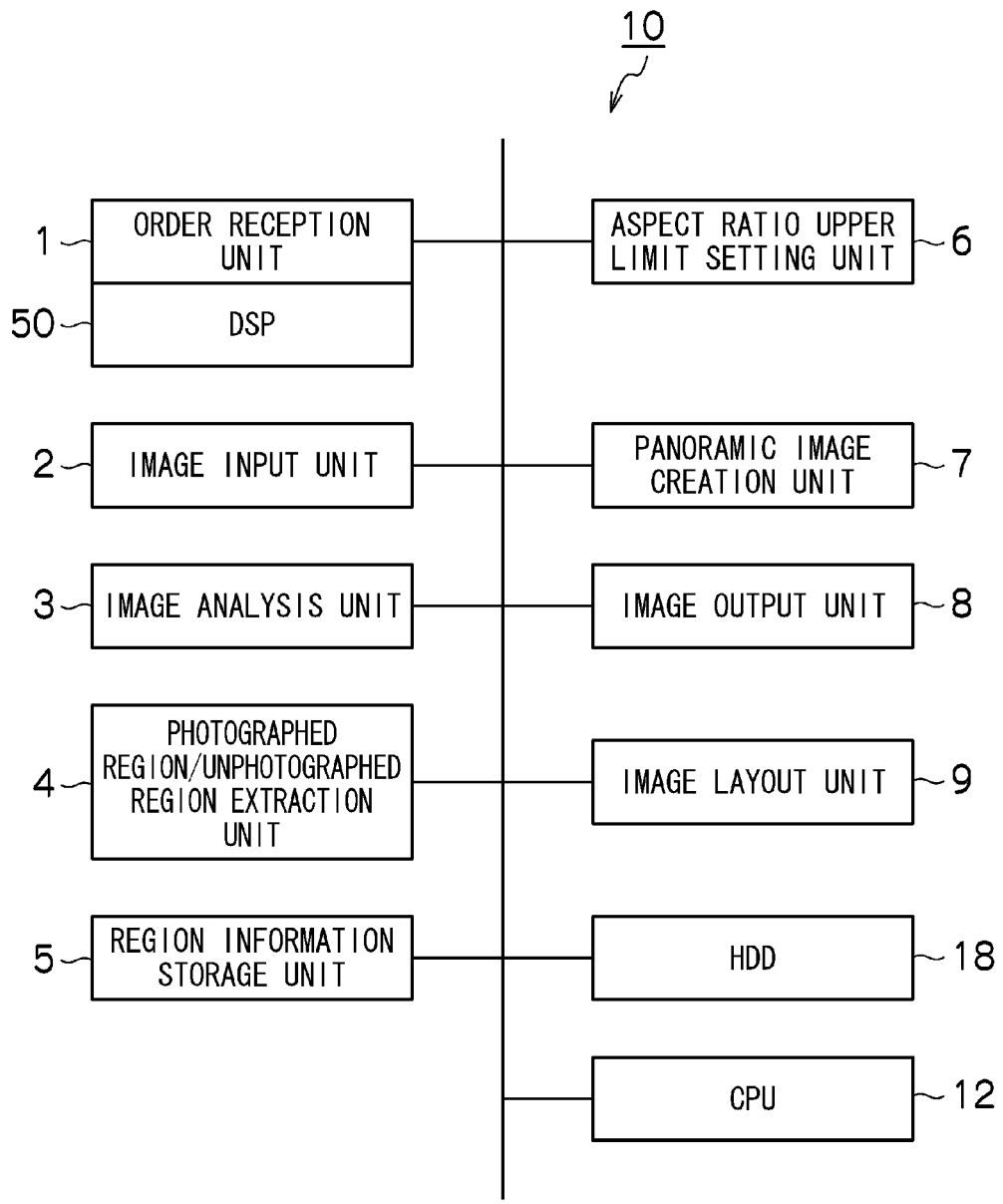
FIG. 1 is a block diagram illustrating a schematic configuration of an image print creating apparatus.

FIG. 1 is a block diagram illustrating a schematic configuration of an image print creating apparatus 10 to which the presently disclosed subject matter is applied. The image print creating apparatus 10 reads an image (including still image data, moving image data, and a moving image frame which is a still image obtained by capturing a moving image) via an image input unit 2, for example, from a storage medium such as various recording media (a CD (Compact Disk), a DVD (Digital Versatile Disk), or the like) or a memory card, from a general-purpose interface for connection with a peripheral device, such as a USB, which is connected to a camera, or from a network such as the Internet or a LAN (Local Area Network). Then, the image print creating apparatus 10 uses the read image as a material to create a photo book (corresponding to data for causing a display apparatus or a print apparatus to output the image with a page-based layout and design or to a print medium such as paper on which the image is printed with the page-based layout and design). As an example, the moving image data is compatible with compression recording standards for Motion JPEG (Joint Photographic Experts Group), MPEG4 (Moving Picture Experts Group), and the like. As an example, the still image data is compatible with image file formats such as JPEG, TIFF (Tag Image File Format), and EXIF (Exchangeable Image File Format) standardized for a digital still camera.

It should be noted that the system configuration of FIG. 1 is given as an example, and the presently disclosed subject matter can be carried out by an information terminal (for example, a personal computer, a print terminal in a shop, a PDA (Personal Digital Assistance), and a mobile phone) having a configuration equivalent thereto. In addition, respective blocks illustrated in FIG. 1 are not necessarily integrally configured in one electronic device, and if each block constitutes a part of a configuration of a different electronic device and mutual information exchange between the electronic devices is secured by any communication tool such as a network, the presently disclosed subject matter can be carried out, and thus is not carried out depending on a particular device configuration.

The image print creating apparatus 10 is operated by an order reception unit 1 including various operation devices. Examples of the operation devices include a touch panel and a pointing device such as a mouse, a touch pad, or a trackball, which is capable of giving an instruction to move a pointer (cursor). The touch panel is stacked on a display 50. When a button display part on the display 50 is pressed, a character corresponding to the pressed part can be inputted, or various functions can be activated.

In addition, the image print creating apparatus 10 is connected to an image output unit 8 which prints designated still images on a mount formed of a paper medium such as plain paper or photographic paper at a predetermined arrangement decided by an image layout unit 9. Alternatively, the still images arranged at the predetermined arrangement can be outputted as an electronic medium such as "PDF" produced by Adobe Systems Incorporated, to the display 50, a recording medium, and a personal computer connected via the Internet.

An HDD 18 stores therein not only one or a plurality of pieces of still image data, moving image frames, and panoramic images which are used as main materials for an image print but also decoration image data (graphics) to be combined with the main materials at the time of creating the image print. It should be understood that the HDD is an example of storage medium and any other medium which can store image data and so on can be used instead of the HDD. The graphics may include: a still image; character data for configuring characters (Chinese characters, katakana and hiragana (both are a set of characters used in Japanese writing), alphabets, symbols, pictorial symbols, other readable significant signs, and a combination thereof. The same applies below.) to be inserted into an image; a text box which include these characters; graphic data of objects, on which the characters are suitably placed, including a speech balloon, a notice board, and a bulletin board and so on; a mask image which covers a part or an entirety of an unnecessary part of a target image; a frame which surrounds a periphery of an image; an illustration; a clip art; and the like. The decoration images as described above decorate a background of the still image used as the main material of the photo book and add one conspicuous decoration, to thereby provide the photo book with beautiful addition.

A panoramic image creation unit 7 creates a panoramic image from a still image or a moving image inputted from the image input unit 2. A specific method therefor can be performed in the same manner as a conventional technology. That is, the panoramic image creation unit 7 connects a plurality of still images (a series of images, such as continuously photographed images, having overlapped parts which enable panorama generation) or a plurality of moving image frames so that the overlapped regions are superimposed on each other, to thereby create the panoramic image. The plurality of moving image frames or still images used as the material of the panoramic image are a series of images, such as continuously photographed images, having overlapped parts of a subject which enable panoramic creation, and a photography method therefor is arbitrarily selected.

A CPU 12 executes a program stored in the HDD 18, to thereby control the entire image print creating apparatus 10.

An image analysis unit 3, a photographed region/unphotographed region extraction unit 4, an aspect ratio upper limit setting unit 6, the panoramic image creation unit 7, and the image layout unit 9 are coprocessors and are each in charge of specialized processing to assist a processing operation of the CPU 12. In addition, a region information storage unit 5 is formed of a volatile storage medium such as a RAM.

The image layout unit 9 decides information about a design of an image print in accordance with a design designation of the image print from the order reception unit 1.

Figure 2:
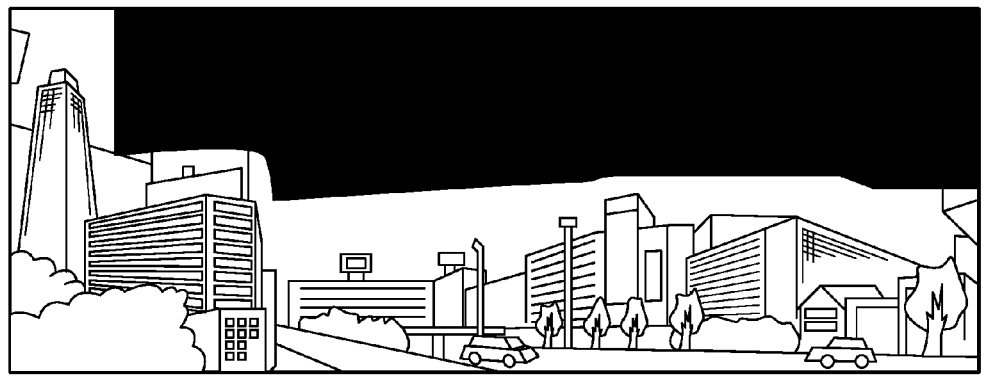
FIG. 2 is a view illustrating an example of a panoramic image.

The photographed region/unphotographed region extraction unit 4 analyzes information of a photographed region (a region in which a subject exists) and an unphotographed region (a region in which a subject does not exist) on a panoramic image or individual images constituting the panoramic image at the time of the panoramic image composition by the panoramic image creation unit 7, to thereby acquire the information which identifies the unphotographed region (for example, positional coordinates and color information). Then, the photographed region/unphotographed region extraction unit 4 stores the information obtained as a result of the analysis into the region information storage unit 5. For example, assuming that a panoramic image as illustrated in FIG. 2 is created by the panoramic image creation unit 7, during the creation of this image, the image analysis unit 3 distinguishes a subject part existing on each still image or each moving image frame or a connection part thereof (photographed region) and a part of the still image or the moving image frame in which the subject does not exist (unphotographed region), and the photographed region/unphotographed region extraction unit 4 stores the positional coordinate information of the unphotographed region on the panoramic image into the region information storage unit 5.

Figure 3:
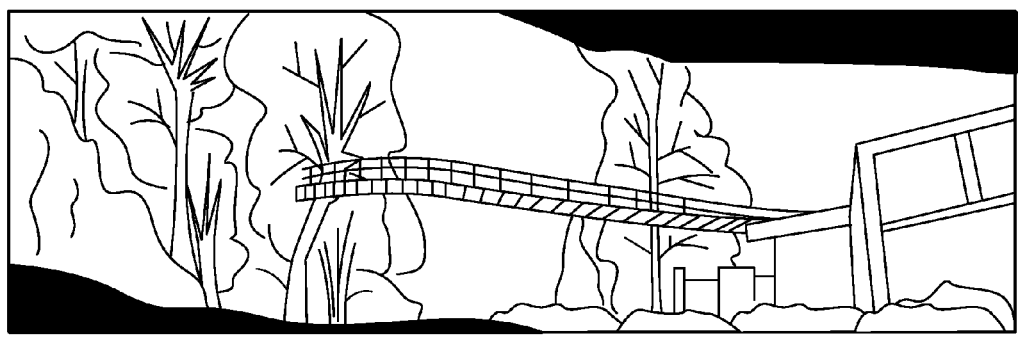
FIG. 3 is a view illustrating an example of a panoramic image in which a predetermined color is placed in an unphotographed region.

Alternatively, as illustrated in FIG. 3, the panoramic image creation unit 7 places a predetermined color (for example, red) in a part in which a still image or a moving image frame does not exist (unphotographed region) at the time of the panoramic image composition by the panoramic image creation unit 7. The image analysis unit 3 discriminates (differentiates) an existence region of the predetermined color from the panoramic image. The predetermined color per se is the information which identifies the unphotographed region, and the existence region having the discriminated color corresponds to the unphotographed region. The photographed region/unphotographed region extraction unit 4 can store the information which identifies the existence region of the predetermined color discriminated by the image analysis unit 3, typically, the positional coordinate information thereof into the region information storage unit 5 as the information which identifies the unphotographed region.

A method of storing the unphotographed region into the region information storage unit 5 by the photographed region/unphotographed region extraction unit 4 is arbitrarily selected. For example, as illustrated in FIG. 4, the photographed region/unphotographed region extraction unit 4 creates a mask image (Portion 2 in FIG. 4) corresponding to the unphotographed region, and stores the generated mask image or a compressed image file thereof into the region information storage unit 5. Information (transparent part) of the mask image may be associated with an alpha channel of the panoramic image. Alternatively, the photographed region/unphotographed region extraction unit 4 stores text information indicating coordinates (800, 0)-(4500, 600) of the unphotographed region as illustrated in FIG. 5 into the region information storage unit 5. Coordinates of the photographed region may be also stored together therewith into the region information storage unit 5.

The image layout unit 9 decides a layout of the photo book including the panoramic image created by the panoramic image creation unit 7 and the graphics other than the panoramic image which are stored in the HDD 18, on the basis of the unphotographed region in the region information storage unit 5.

Figure 6:
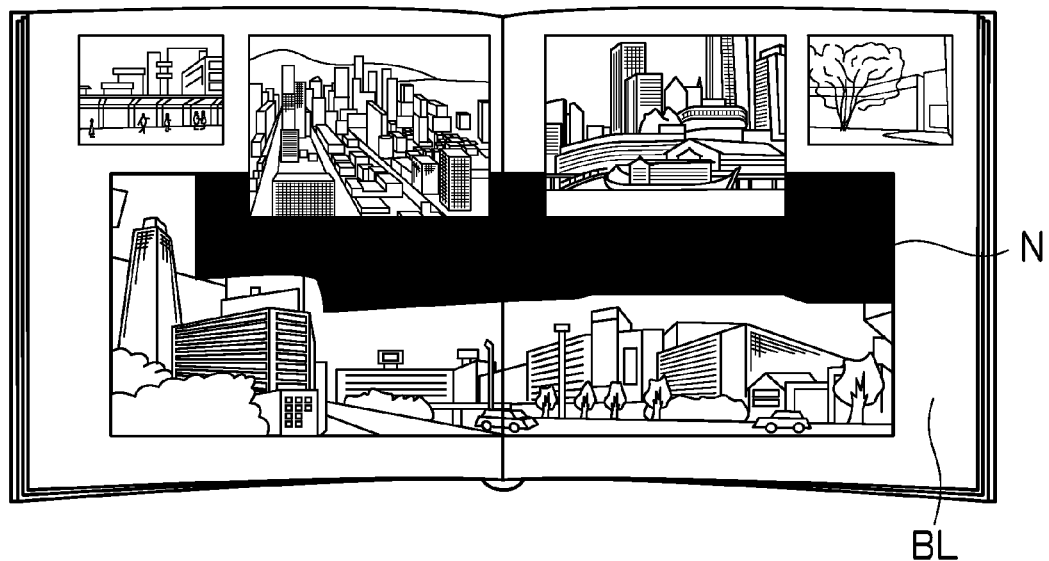
FIG. 6 is a view illustrating a layout example of graphics which are placed in the unphotographed region.

For example, as illustrated in FIG. 6, the image layout unit 9 decides the layout in which one or a plurality of graphics having a shape and a size which fit a blank region BL in which the panoramic image does not exist and an unphotographed region N in the region information storage unit 5 are placed in the unphotographed region. Preferably, the image layout unit 9 decides a layout in a manner that the unphotographed region which is covered partially or entirely by the graphics (that is, the unphotographed region having an overlapped part with the graphics) has the smallest area. An area of the blank region BL normally exceeds zero, but may be equal to zero.

In the case where the arrangement of graphics on a given page has been decided in advance, the image layout unit 9 selects such a panoramic image that makes the smallest the area of blank space in which those graphics do not exist and the area of the unphotographed region, and decides the layout in which the selected panoramic image is placed on the given page. Also in this case, it is preferable that the image layout unit 9 decide a layout in a manner that the unphotographed region which is covered by those graphics has the smallest area.

Figure 7:
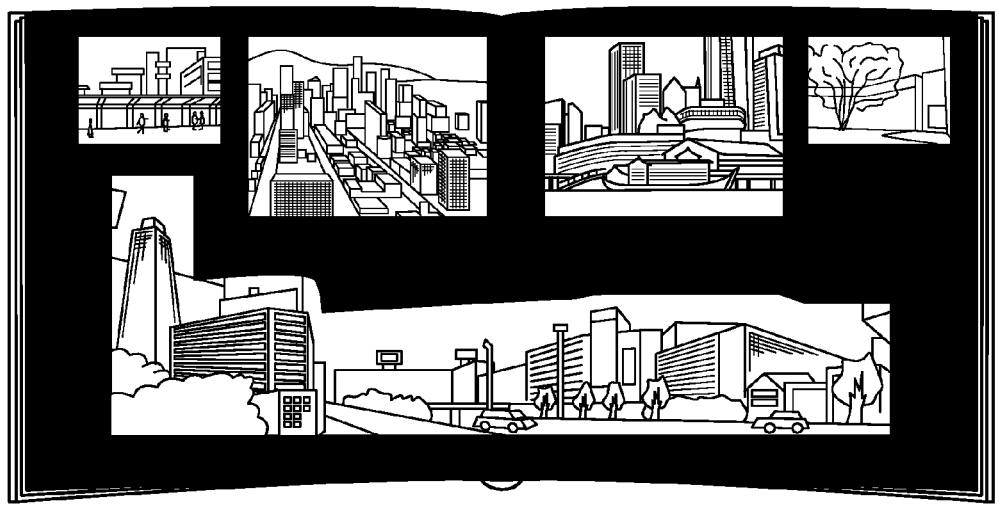
FIG. 7 is a view illustrating an example of integrated colors of a blank region and the unphotographed region.

In actuality, it is preferable that colors of the blank region BL and the unphotographed region N be integrated into the same color, for example, black as illustrated in FIG. 7. Alternatively, the color of the blank region BL may be the same as or similar to the color information of the unphotographed region N. For example, if the unphotographed region N is white, the blank region BL is also set to be white.

With this configuration, unlike the conventional case (see FIG. 8) where an arbitrary image is simply placed in the blank region in which a panoramic image does not exist, it is possible to effectively utilize the unphotographed region of the panoramic image as an arrangement region of the graphics, to thereby provide a high-value photo book.

Alternatively, the unphotographed region N may be set to be transparent, and a background image and its color on a rear side of the panoramic image may be outputted as they are. In this case, in order to reflect a color of a mount in the background on a print as it is, it is preferable that color correction be performed only on the photographed region. This is because, if the same color correction as the photographed region is performed on the unphotographed region, an original color of the background on a rear side of the unphotographed region, for example, a white color is changed into a different color. It is preferable to prevent a frame from being placed on a periphery of the panoramic image, the periphery including the transparent unphotographed region.

Figure 9:
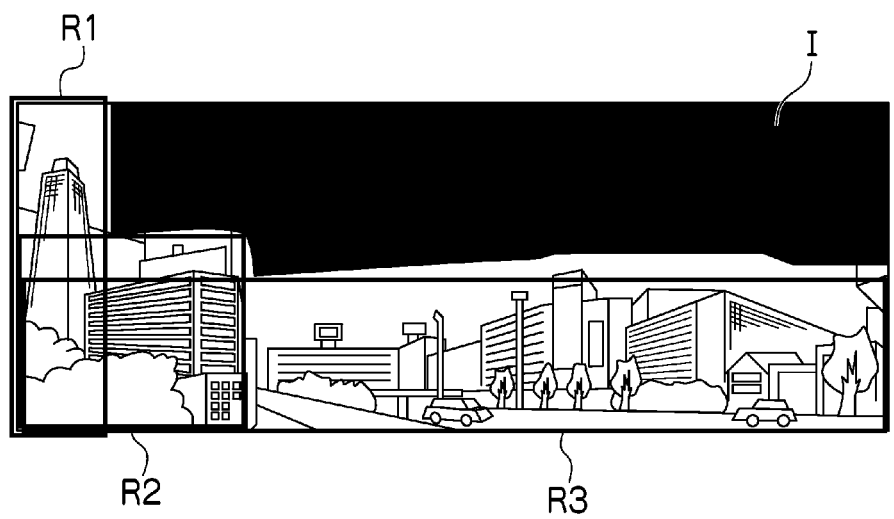
FIG. 9 is a view illustrating an example of a partial cut-out region from a panoramic image.

It should be noted that the image analysis unit 3 can decide a rectangular region which is partially cut out from a panoramic image on the basis of the photographed region and the unphotographed region. In FIG. 9, the image analysis unit 3 decides three rectangular partial regions R1 to R3 on a panoramic image I. The image analysis unit 3 cuts out the decided rectangular regions and stores the cut-out regions into the HDD 18. The rectangular regions stored in the HDD 18 can be placed in the unphotographed region or the like of the identical photo book including the panoramic image from which the rectangular regions are cut out or another photo book.

It is arbitrary as to what criterion is used to cut out the rectangular region, but the following procedure is advisable in order to extract a rectangular region having as high an importance as possible.

For example, the image analysis unit 3 creates rectangular region patterns each having an arbitrary size, an arbitrary aspect ratio, and an arbitrary position which contain only the photographed region of the panoramic image in a random manner or in a manner that all patterns are covered, and then decides, from among the created patterns, a pattern having an aspect ratio equal to or larger than a predetermined threshold value as a rectangular region to be cut out.

Figure 10:
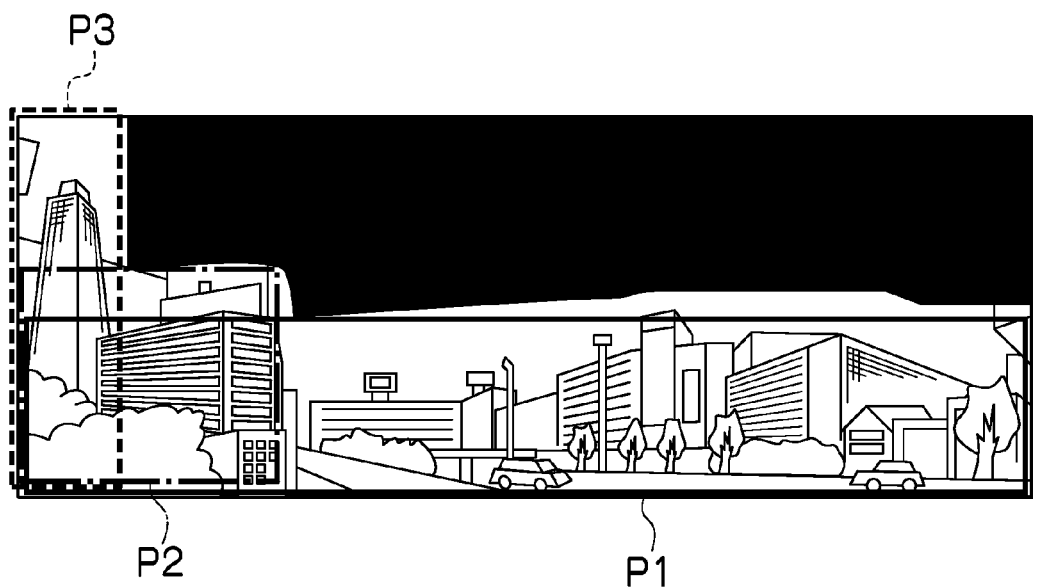
FIG. 10 is a view illustrating an example of a cut-out region which is decided on the basis of an aspect ratio.

As illustrated in FIG. 10, among height/width aspect ratios of rectangular region patterns P1 to P3, the height/width aspect ratio of the pattern P3, which exceeds a threshold value of 1, is the largest (its height is larger than its width). In this case, the pattern P3 is decided as the rectangular region to be cut out.

Alternatively, the image analysis unit 3 analyzes the following attributes about the respective patterns which are created as described above.

(a) The number of a particular type of subjects contained in each pattern. For example, the number of person subjects.

(b) The size of a subject contained in each pattern. Alternatively, the size of a particular part of the subject, for example, a face thereof.

(c) The time period required for photographing image information contained in each pattern. This corresponds to a time interval from the first photographing time point to the last photographing time point of a moving image frame or a still image frame constituting the image information.

(d) The aspect ratio of each pattern or the information derived from the aspect ratio. For example, the information indicating whether each pattern is larger in height or larger in width. See, for example, FIG. 10 and the related description above.

(e) The area (planar dimension) of each pattern.

The image analysis unit 3 sets the order of priority to each pattern in accordance with the analyzed attributes. For example, with regard to the above-mentioned attributes (a) to (e), the order of priority is set as follows.

Figure 11:
FIG. 11 is a view illustrating an example of a cut-out region which is decided on the basis of the number of contained person subjects.

(a) Set a higher order of priority to a pattern containing a larger number of a particular type of subjects. For example, in FIG. 11, the numbers of person subjects contained in rectangular region patterns Q1 to Q3 are 3, 1, and 0, respectively, and hence the order of priority is set as Q1>Q2>Q3.

(b) Set a higher order of priority to a pattern having a larger size of a subject or a larger size of a particular part of the subject.

(c) Set a higher order of priority to a pattern for which a longer time is required for photographing the image information.

(d) Set a higher order of priority to a pattern which is larger in height. Alternatively, set a higher order of priority to a pattern which is larger in width.

(e) Set a higher order of priority to a pattern having a larger area.

(f) Set a higher order of priority to a pattern having a smaller photographed area per unit time. For example, as shown in FIG. 12, on the basis of the sizes of the photographed areas of patterns T1 to T3 per unit time, the order of priority is set as T2>T3>T1. This is because a smaller photographed area of a pattern per unit time indicates that the image information within this pattern is more slowly photographed over time, and the pattern having the smaller photographed area per unit time can be considered to have a higher importance.

The photographed region/unphotographed region extraction unit 4 cuts out a predetermined number of (one or a plurality of) rectangular regions in descending order from a pattern having the highest order of priority set by the image analysis unit 3.

Instead of setting the order of priority to the patterns themselves as described above, the order of priority may be set to partial regions of the patterns. For example, a higher order of priority is set to a common region having a larger number of overlapped patterns. For rectangular region patterns D1 to D3 as illustrated in FIG. 13, the highest order of priority is set to a region R1 which is common to all of the patterns D1, D2, and D3.

The same order of priority is set to a common region of the patterns D1 and D2, a common region of the patterns D1 and D3, and a common region of the patterns D2 and D3. A higher order of priority may be set to a common region corresponding to a pattern having a higher order of priority in terms of the above-mentioned attributes (a) to (f).

For example, it is assumed in FIG. 14 that V1>V2>V3 is set in descending order as the order of priority of patterns V1 to V3 in terms of the above-mentioned attributes (a) to (f).

In this case, the image analysis unit 3 sets the first order of priority to a common region of all of the patterns V1, V2, and V3, the second order of priority to a common region of the patterns V1 and V2, and the third order of priority to a common region of the patterns V2 and V3. The photographed region/unphotographed region extraction unit 4 cuts out a predetermined number of (one or a plurality of) rectangular regions in descending order from a partial region having the highest order of priority set by the image analysis unit 3. If an area of the partial region having the highest order of priority does not reach a desired area (or a desired aspect ratio), the photographed region/unphotographed region extraction unit 4 may further extract a partial region having the second highest order of priority, to thereby obtain the desired area (or the desired aspect ratio). In an example shown in FIG. 14, a pattern V0, which is shaded in FIG. 14, is extracted. The pattern V0 is formed of an entirety of the pattern V1 and a part of the pattern V2 and has a desired area.

Figure 15:
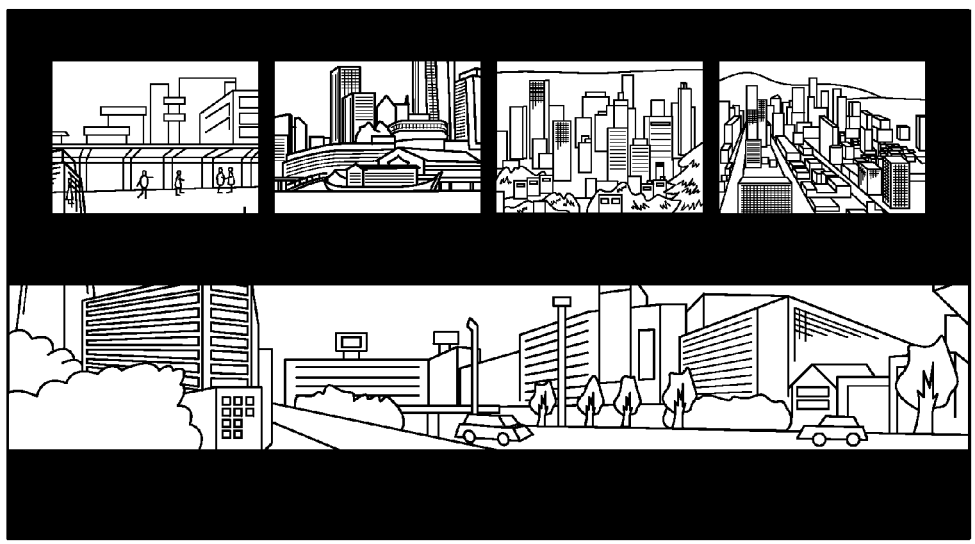
FIG. 15 is a view illustrating an arrangement example of cut-out rectangular regions.

The cut-out rectangular regions can be placed in the unphotographed region or the like of the identical photo book including the panoramic image from which the rectangular regions are cut out or another photo book. FIG. 15 illustrates an arrangement example of the cut-out rectangular regions.

Figure 16:
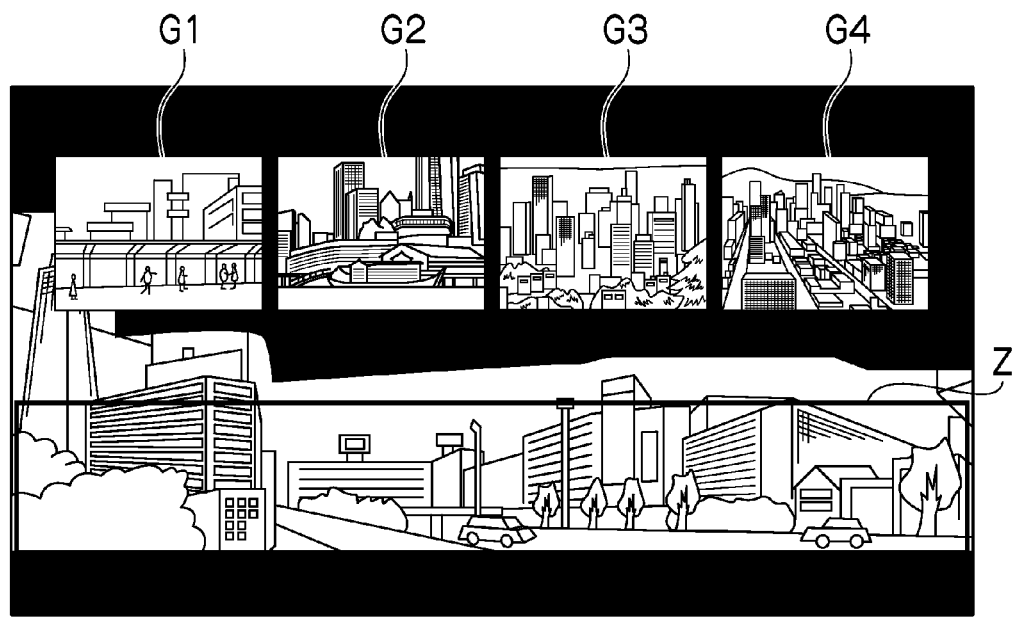
FIG. 16 is a view illustrating an example of graphics which are placed on a front side of the unphotographed region.

On the other hand, a rectangular region to which a higher order of priority is not set is regarded similarly to the unphotographed region, and a placed graphic is preferentially outputted rather than that rectangular region. For example, as illustrated in FIG. 16, a part of the panoramic image other than a rectangular region Z having a higher order of priority is regarded similarly to the unphotographed region, and graphics G1 to G4 are placed on a front side of the unphotographed region (i.e., placed over the unphotographed region).

The aspect ratio upper limit setting unit 6 decides an upper limit of an aspect ratio of the panoramic image on the basis of the size or aspect ratio of the photo book received from the order reception unit 1.

The print size or aspect ratio of the print of the photo book makes visual quality different even for panoramic images having the same aspect ratio. For example, as illustrated in FIG. 17, when a panoramic image PI larger in width is placed on a photo book PB1 which is larger in width (state 1 in FIG. 17), a viewer does not feel a sense of discomfort, whereas when the panoramic image larger in width is placed on a photo book PB2 which is not larger in width (state 2 in FIG. 17), positional deviation of the panoramic image and deviation of blank space make the viewer feel a sense of discomfort.

In view of this, the aspect ratio upper limit setting unit 6 decides the upper limit of the aspect ratio of the panoramic image which fits the size or aspect ratio of the photo book set via the order reception unit 1 or the like in a manner that the positional deviation of the panoramic image is not caused to thereby enhance the visual quality. The aspect ratio at which an area of blank space on a page on which the panoramic image is placed reaches a predetermined upper limit may be decided as the upper limit of the image aspect ratio.

FIGS. 18A and 18B each show an example of the decided upper limits of the image aspect ratios. The aspect ratio upper limit setting unit 6 decides: when the size of the photo book is 3,000×3,000, 1:8 as the upper limit of the aspect ratio corresponding to this size; when the size of the photo book is 3,000×2,000, 1:6 as the upper limit of the aspect ratio corresponding to this size; and when the size of the photo book is 1,500×3,000, 1:2 as the upper limit of the aspect ratio corresponding to this size.

For example, the upper limits of the aspect ratios of the panoramic images as shown in FIG. 18A are decided in accordance with a relational expression between the aspect ratio of the print size and the aspect ratio of the panoramic image size as shown in FIG. 18B. The relational expression as shown in FIG. 18B is stored in advance in a storage medium such as the HDD 18, and the aspect ratio upper limit setting unit 6 determines, from the stored relational expression, the aspect ratio of the panoramic image corresponding to the aspect ratio of a desired print size specified via the order reception unit 1, to thereby decide the upper limit of the aspect ratio of the panoramic image to be created by the panoramic image creation unit 7 in accordance with the print size.

The slope of the graph of FIG. 18B may be set in accordance with a type of the photo book to be created or set by a user himself/herself who creates the photo book via the order reception unit 1.

For example, if the slope set by the user is large, the upper limit of the aspect ratio becomes correspondingly large. In this case, the balance may be slightly lost or a height of the displayed panoramic image may become smaller, but the entire panoramic image can be arranged on the photo book.

On the other hand, if the slope set by the user is small, the upper limit of the aspect ratio becomes correspondingly small. In this case, the panoramic image can be placed in a balanced manner, but there is a possibility that a part of the panoramic image cannot be displayed depending on the aspect ratio. Therefore, it is preferable to allow the user to select a degree of the slope in accordance with taste of the user.

In addition, the relational expression itself may be set by the user via the order reception unit 1. The relational expression shown in FIG. 18B is a mere example, and the presently disclosed subject matter is not limited to a linear function form.

FIGS. 19A to 19C illustrate cases where panoramic images according to the upper limit of the image aspect ratio decided as shown in FIGS. 18A and 18B are arranged (placed) on the photo book having a corresponding size. The upper limit of the aspect ratio here relates to the arrangement of the panoramic image on two facing pages; however, the upper limit of the image aspect ratio relating to the arrangement of the panoramic image on a single page may be decided.

Figure 20:
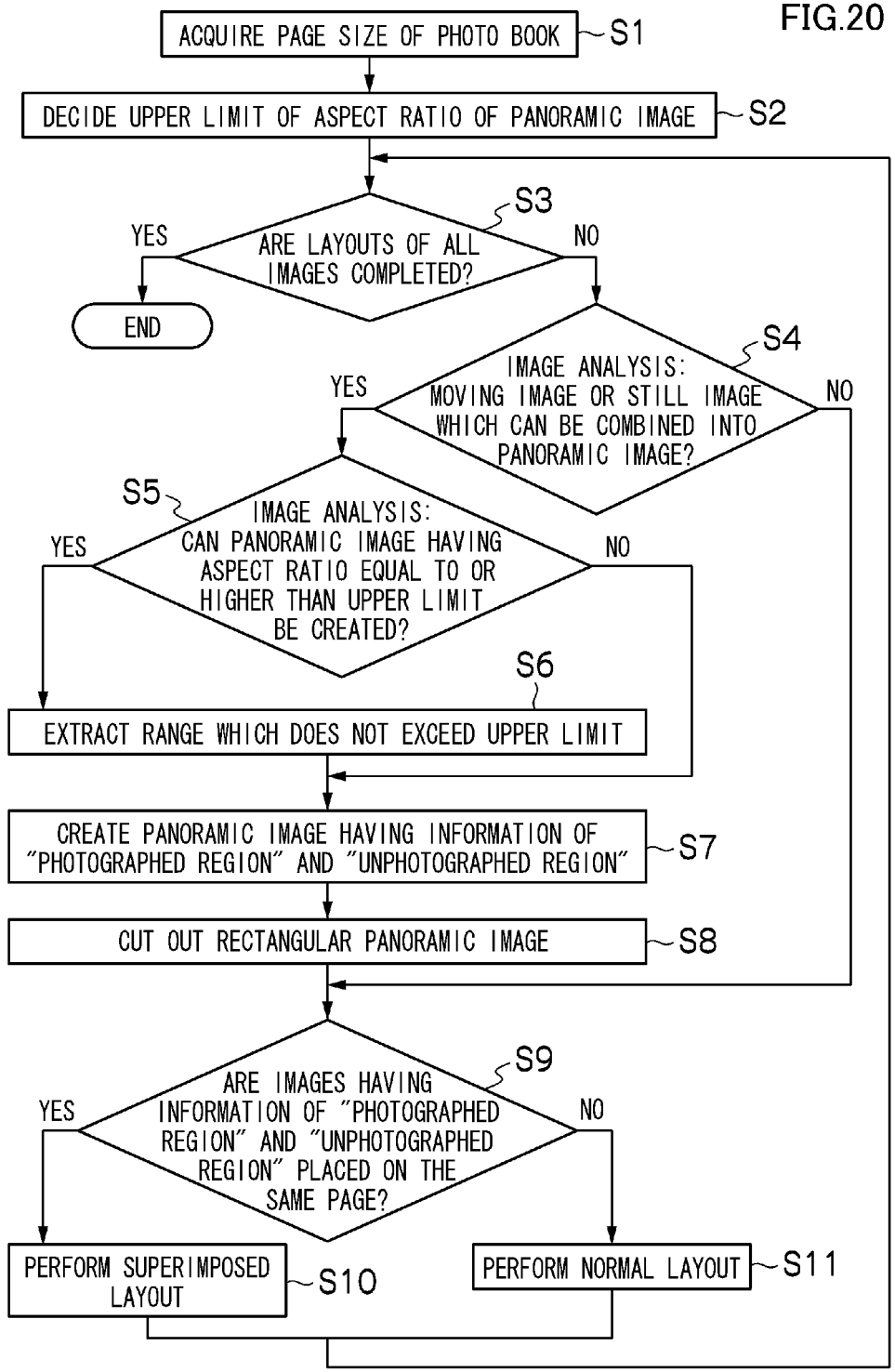
FIG. 20 is a flowchart showing a layout deciding process.

FIG. 20 is a flowchart showing a layout deciding process executed by the image print creating apparatus 10. This process is controlled by the CPU 12. Programs for causing the CPU 12 to execute this process are stored in the HDD 18 and other computer-readable storage media. It should be noted that this process is started when an instruction to create the photo book is inputted via the order reception unit 1.

In S1, the CPU 12 receives the size of the photo book from the order reception unit 1.

In S2, the CPU 12 controls the aspect ratio upper limit setting unit 6 to decide the upper limit of the aspect ratio of the panoramic image on the basis of the size of the photo book received via the order reception unit 1. An example of the decided upper limits of the aspect ratios is as shown in FIGS. 18A and 18B. The aspect ratio upper limit setting unit 6 may set a value specified via the order reception unit 1 as the upper limit of the aspect ratio without any change.

In S3, the CPU 12 determines whether or not the layouts for all of the ordered images are decided by the image layout unit 9. The ordered images are images which are selected as ones used for the photo book via the order reception unit 1 from among the images inputted from the image input unit 2. If the layouts for all of the ordered images are decided, the process is ended. If the layouts for all of the ordered images are not decided, the process proceeds to S4. It should be noted that an arrangement page of each ordered image can be arbitrarily specified via the order reception unit 1.

In S4, the CPU 12 instructs the image analysis unit 3 to analyze whether or not each ordered image is a moving image or a still image which can be combined into a panoramic image. As a result of the analysis, if the ordered image is a moving image or a still image which can be combined into a panoramic image, the process proceeds to S5, and if not, the process proceeds to S9. The determination of whether or not the ordered image can be combined into a panoramic image is made based on whether or not a plurality of moving image frames or still images constituting the ordered image have overlapped subject parts with each other.

In S5, the CPU 12 controls the panoramic image creation unit 7 to create the panoramic image on the basis of the ordered image. The CPU 12 determines whether or not the aspect ratio of the panoramic image which is created by the panoramic image creation unit 7 on the basis of the moving image or the still image analyzed in S4 is equal to or higher than the upper limit of the aspect ratio decided in S2. In the case of Yes, the process proceeds to S6. In the case of No, the process proceeds to S7.

Figure 21:
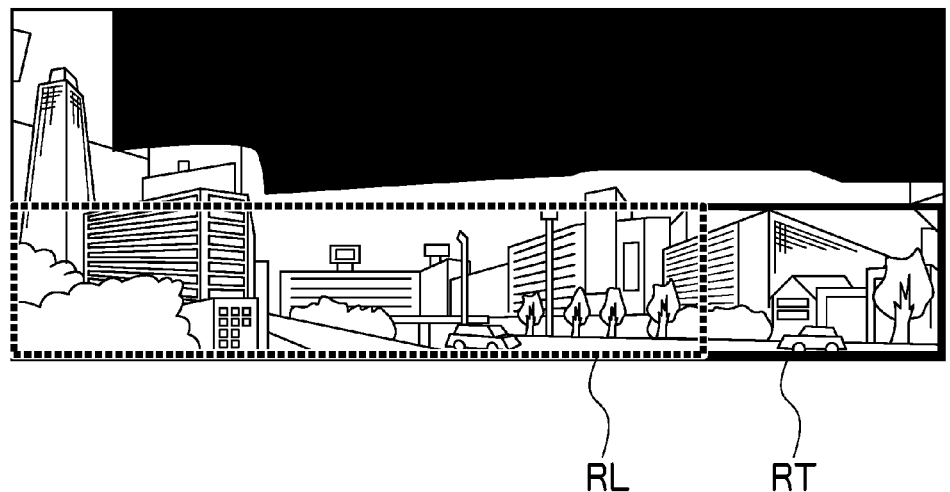
FIG. 21 is a view illustrating a relation between a panoramic image which can be created from an ordered image and a range according to the upper limit of the aspect ratio.
Figure 22:
FIG. 22 is a view illustrating an example of the photo book in which a panoramic image is placed.
Figure 23:
FIG. 23 is a view illustrating an example of a panoramic image having an uneven boundary region.

In S6, the CPU 12 controls the panoramic image creation unit 7 to create the panoramic image within the range according to the upper limit of the aspect ratio. On this occasion, the panoramic image creation unit 7 may identify a feature part (for example, a face of a person detected by a conventional face detection technology and a structural line detected by a conventional structural outline analysis technology) of the panoramic image by means of the image analysis unit 3, and may create the panoramic image in a manner that the identified feature part is located at a predetermined position (for example, in the center). FIG. 21 illustrates a relation between a panoramic image RT which can be created from ordered images and a range RL according to the upper limit of the aspect ratio.

Alternatively, the CPU 12 may extract a range which does not exceed the upper limit of the aspect ratio, from the created panoramic image. On this occasion, the CPU 12 may extract the range which does not exceed the upper limit of the aspect ratio, from the panoramic image which is created by identifying the feature part (for example, a face of a person) of the panoramic image by the image analysis unit 3 and locating the identified feature part at a predetermined position (for example, in the center).

In S7, the CPU 12 controls the photographed region/unphotographed region extraction unit 4 to store the information which identifies the unphotographed region into the region information storage unit 5. The information which identifies the unphotographed region includes the examples illustrated in FIGS. 3 to 5.

In S8, the CPU 12 controls the image analysis unit 3 to decide the rectangular partial region to be cut out from the panoramic image. A desired rectangular partial region is extracted. The examples of the rectangular region are as illustrated in FIGS. 9, 10, 11, 13, and 14.

In S9, the CPU 12 instructs the image layout unit 9 to place the panoramic image created by the panoramic image creation unit 7 on a designated page which is a desired page of the photo book designated via the order reception unit 1. The CPU 12 determines whether or not the unphotographed region corresponding to the placed panoramic image is stored in the region information storage unit 5. In the case of Yes, the process proceeds to S10. In the case of No, the process proceeds to S11.

In S10, the CPU 12 controls the image layout unit 9 to decide the layout of the photo book including the panoramic image created by the panoramic image creation unit 7 and the graphics other than the panoramic image which are stored in the HDD 18, on the basis of the unphotographed region in the region information storage unit 5 and the blank space on the designated page. The examples of the decided layout are as illustrated in FIGS. 6, 15, and 16.

Figure 8:
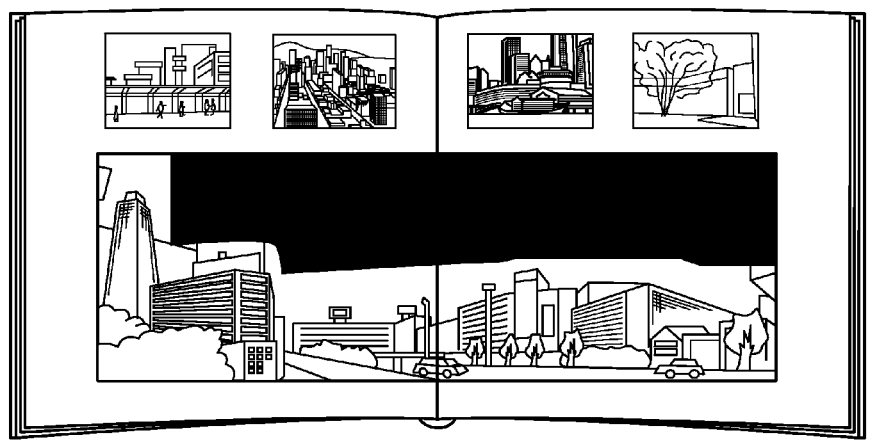
FIG. 8 is a view illustrating an example where an arbitrary image is placed in the blank region in which a panoramic image does not exist.

In S11, the CPU 12 controls the image layout unit 9 to decide the layout of the photo book including the panoramic image created by the panoramic image creation unit 7 and the graphics other than the panoramic image which are stored in the HDD 18, on the basis of the blank space on the designated page. The example of the decided layout is as illustrated in FIG. 8.

It should be noted that the panoramic image described above may not necessarily be created by combining a plurality of images by the panoramic image creation unit 7, and may be various images inputted from the outside. For example, it is also possible to input, as the panoramic image, a wide-angle image which is photographed by a special wide-angle lens such as a fisheye lens without any change. The photographed region/unphotographed region extraction unit 4 can distinguish the photographed region and the unphotographed region on the inputted panoramic image, and store the positional coordinate information of the unphotographed region on this panoramic image into the region information storage unit 5. In short, the layout deciding process can be applied to any image as long as the image has an unphotographed region generated thereon, irrespective of a creation method therefor.

In addition, application of the layout deciding process is not limited to graphic arrangement in a photo book. This process is applicable to graphic arrangement in various printing material including a plurality of image prints and post cards.

While examples and embodiments of the present invention have been explained in detail, the present invention is not limited to the above, needless to say, various improvements and modifications may be added without departing from the scope of the present invention. For example, the presently disclosed subject matter includes a non-transitory recording medium on which a program is stored, the program controlling a computer (an information processing apparatus) to execute the graphic arrangement deciding method according to any one of the aspects.

What is claimed is:

1. A graphic arrangement deciding method to be performed by an information processing apparatus, comprising:

from a wide-angle image, acquiring photographed region information corresponding to i) photographed information which identifies a photographed region of the wide-angle image, and ii) unphotographed region information corresponding to information which identifies an unphotographed region of the wide-angle image, the wide-angle image created by superimposing a plurality of images including at least one of i) still images and ii) moving image frames, the plural images including subjects which at least partially overlap with each other so that overlapping parts of the subjects are superimposed with each other, wherein the photographed region of the wide-angle image is cut into plural partial regions;

setting an order of priority of each partial region which is located at a desired position and has a desired size within the photographed region identified by the photographed region information, on the basis of an attribute of the partial region; and deciding arrangement of one or a plurality of graphics associated with the wide-angle image, on the basis of the unphotographed region information and the order of priority of each partial region, wherein the order of priority of each individual partial region is set on the basis of an area of the photographed area of each partial region per unit photographing time.

2. The graphic arrangement deciding method according to claim 1, further comprising extracting one or a plurality of partial regions from the wide-angle image on the basis of the order of priority.

3. The graphic arrangement deciding method according to claim 2, further comprising deciding arrangement of the one or the plurality of extracted partial regions as the one or the plurality of graphics associated with the wide-angle image.

4. The graphic arrangement deciding method according to claim 2, further comprising deciding the arrangement of the graphics associated with the wide-angle image so that the extracted partial regions avoid overlapping with the graphics.

5. The graphic arrangement deciding method according to claim 1, further comprising deciding the arrangement of the graphics associated with the wide-angle image so that the photographed region avoids overlapping with the graphics.

6. The graphic arrangement deciding method according to claim 1, further comprising deciding the arrangement of the graphics associated with the wide-angle image so that blank space on an arrangement page and the unphotographed region of the wide-angle image overlaps with the graphics.

7. The graphic arrangement deciding method according to claim 1, further comprising
deciding an upper limit of an aspect ratio of the wide-angle image on the basis of a size of an arrangement page of the wide-angle image.

8. The graphic arrangement deciding method according to claim 7, further comprising
creating the wide-angle image on the basis of the decided upper limit of the aspect ratio.

9. The graphic arrangement deciding method according to claim 8, further comprising
extracting the partial region from the wide-angle image on the basis of the decided upper limit of the aspect ratio.

10. The graphic arrangement deciding method according to claim 1, wherein the unphotographed region information includes one of positional coordinates of the unphotographed region on the wide-angle image and a predetermined color on the wide-angle image.

11. A non-transitory recording medium on which a program is recorded, the program comprising computer-executable instructions of:
acquiring photographed region information corresponding to information which identifies a photographed region and unphotographed region information corresponding to information which identifies an unphotographed region, from a wide-angle image created by superimposing a plurality of images including at least one of i) still images and ii) moving image frames including subjects which at least partially overlap with each other so that the overlapping parts of the subjects are superimposed with each other;
setting order of priority of a partial region which is located at a desired position and has a desired size within the photographed region identified by the photographed region information, on the basis of an attribute of the partial region; and
deciding arrangement of one or a plurality of graphics associated with the wide-angle image, on the basis of the unphotographed region information and the order of priority of the partial region,
wherein the order of priority of the partial region is set on the basis of an area of the photographed area of the partial region per unit photographing time.

12. An information processing apparatus comprising:
a photographed region/unphotographed region extraction unit for acquiring photographed region information corresponding to information which identifies a photographed region and unphotographed region information corresponding to information which identifies an unphotographed region, from a wide-angle image created by superimposing a plurality of images including at least one of i) still images and ii) moving image frames including subjects which at least partially overlap with each other so that the overlapping parts of the subjects are superimposed with each other;
an image analysis unit for setting order of priority of a partial region which is located at a desired position and has a desired size within the photographed region identified by the photographed region information, on the basis of an attribute of the partial region; and
an image layout unit for deciding arrangement of one or a plurality of graphics associated with the wide-angle image, on the basis of the unphotographed region information and the order of priority of the partial region,
wherein the order of priority of the partial region is set on the basis of an area of the photographed area of the partial region per unit photographing time.

13. A graphic arrangement deciding method according to claim 1, wherein the unphotographed region is painted in black.

14. A graphic arrangement deciding method according to claim 1, wherein the order of priority of the partial region is set on the basis of the number of person subjects within the partial region.

15. A graphic arrangement deciding method according to claim 1, wherein the order of priority of the partial region is set on the basis of a smaller photographed area of an individual partial region per unit time indicates that the image information within the individual partial region is more slowly photographed over time, and the individual partial region having the smaller photographed area per unit time is considered to have a higher importance.

\* \* \* \* \*